United States Patent
Saliba et al.

(10) Patent No.: US 11,380,273 B2
(45) Date of Patent: Jul. 5, 2022

(54) HARDWARE-LEVERAGED INTERFACE DISPLAY EFFECTS

(71) Applicant: Amazon Technologies, Inc., Reno, NV (US)

(72) Inventors: Elie Saliba, San Jose, CA (US); Hao Hu, Redwood City, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/091,716

(22) Filed: Nov. 6, 2020

(65) Prior Publication Data
US 2022/0148525 A1    May 12, 2022

(51) Int. Cl.
| | |
|---|---|
| *G09G 3/34* | (2006.01) |
| *G09G 3/20* | (2006.01) |
| *G02F 1/167* | (2019.01) |
| *G06F 3/04883* | (2022.01) |
| *G06F 9/451* | (2018.01) |
| *H04L 67/10* | (2022.01) |
| *G06N 3/08* | (2006.01) |
| *G06F 3/0483* | (2013.01) |

(52) U.S. Cl.
CPC .............. *G09G 3/344* (2013.01); *G02F 1/167* (2013.01); *G06F 3/04883* (2013.01); *G06F 9/452* (2018.02); *G06N 3/08* (2013.01); *G09G 3/2003* (2013.01); *H04L 67/10* (2013.01); *G06F 3/0483* (2013.01); *G09G 2310/0264* (2013.01); *G09G 2330/02* (2013.01)

(58) Field of Classification Search
CPC ........................................ G09G 3/344–3453
See application file for complete search history.

(56) References Cited

U.S. PATENT DOCUMENTS

| | | | | |
|---|---|---|---|---|
| 2008/0309674 | A1* | 12/2008 | Barrus | G09G 3/344 345/545 |
| 2010/0231579 | A1* | 9/2010 | Kanbayashi | G09G 3/344 345/214 |
| 2011/0181531 | A1* | 7/2011 | Pan | G02F 1/1679 345/173 |
| 2012/0200610 | A1* | 8/2012 | Sakamoto | G09G 3/344 345/690 |
| 2013/0135215 | A1* | 5/2013 | Bozarth | G06F 3/147 345/173 |
| 2014/0240333 | A1 | 8/2014 | Shirota | |

FOREIGN PATENT DOCUMENTS

CN         109 272 948         1/2019

OTHER PUBLICATIONS

International Search Report and Written Opinion issued in PCT Application No. PCT/US2021/058091, dated Feb. 18, 2022.

* cited by examiner

*Primary Examiner* — Roy P Rabindranath
(74) *Attorney, Agent, or Firm* — Hogan Lovells US LLP

(57) ABSTRACT

Buttons and other interactive functionality for touchscreen displays of e-book and other electronic media content can be automatically optimized for viewing on client devices, in particular those employing an electrophoretic display. A hardware display driver pushes e-ink material through various predetermined voltage waveforms to consistently accomplish interface effects such as color inversion for a button which is touched on the interface screen. Machine learning schema can assist in determining the appropriate waveforms for interactive elements in the content.

18 Claims, 5 Drawing Sheets

HARDWARE-LEVERAGED INTERFACE DISPLAY EFFECTS

BACKGROUND

Consumers are increasingly utilizing various electronic devices to access digital content. In the case of an electronic book ("e-book"), for example, one can use a portable computing device such as an e-book reader ("e-reader") to peruse the various pages of the book, be it a piece of fiction or a research article in a technical journal. E-reader devices typically employ an electrophoretic display to mimic the appearance of "ordinary" ink on paper, by reflecting light in a manner similar to paper. A user interface for such a device often will render a given display area differently, particularly upon receipt of user input, for a better user interaction. Indeed, an important and very common display rendering practice, especially on a laptop or other mobile-type computing device, is button inversion, which serves as an acknowledgment of user input or feedback. For example, most software applications will change a display button's background color and its text color to reflect that the button on the display has been pressed and that a selected action will be taken.

In the case of an e-reader specifically, button inversion has been accomplished by strictly software-based rendering of the corresponding background and text colors. For example, a button having a white background and black text will have its display updated such that the background color changes to black, and the text color becomes white. This inversion effect traditionally is achieved by either invoking a direct software library call, such as via the Java object-oriented programming language, to a two-dimensional ("2-D") graphic layer to fill the button with the corresponding color or let the application layer take care of the drawing call, such as by using a native graphical user interface ("GUI") software framework. However, a notable problem with such approach is that the inversion (or other) view update on the e-reader could be blended with an existing update (i.e., a page turn) or happen at a time differing from the color update; this causes the button color inversion to effectively not show for the reader (as it may occur extremely rapidly), and leads to a frustrating user experience.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to button inversion and other interface display effects on e-readers and other computing devices. Various embodiments utilize one or more algorithms in connection with "electronic paper" and other electrophoretic displays, including the E INK® offering of E Ink Corporation of Hsinchu, Taiwan (for the sake of convenience, the term "e-ink" is used herein to broadly encompass all such, and similar, display technologies). More particularly, the present systems and methods use hardware device driver capabilities to perform a flash-style screen update, causing an update separate from any that exists, to directly achieve touchscreen user interface effects; this guarantees the interface button's effects, thereby providing a better e-reader experience, as the user will see that his or her feedback has been received by the device. It should be well noted that, the terms button and e-book are also used herein solely for convenience and not at all limiting, as the present disclosure can be applied to a myriad of touchscreen display effects and regions as well as other types of electronically-provided content, in addition to e-books.

In particular, one or more modules and/or algorithms can detect the layout of a given piece of e-book content, apply a touchscreen electrophoretic device user interface with appropriate hardware-involved functionality, and, automatically, without relying on image or frame buffering or a separate graphics software library, perform a button color inversion or other effect. To be more specific, an application programming interface ("API") flash operation to update the screen, or a particular region on it, is triggered by a hardware layer device driver. In avoiding page-reset or other types of buffering, the inversion or other effect is accomplished more quickly and more reliably. As is known in the art, a hardware display driver is a semiconductor integrated circuit, or a state machine made of discrete logic and other components, interfacing between one or more processors and a display device, such as an electrophoretic display; the display driver accepts commands and data using an industry-standard general-purpose serial or parallel interface, and it generates signals with suitable voltage, current, timing and demultiplexing to make the subject display show desired text or imagery. The display driver may be an application-specific microcontroller and could use various types of memory, firmware, and display fonts. The present hardware-based effect optimization is applied in a way that is adaptable to varying device screen sizes. Various other functions and advantages are described and suggested as may be provided in accordance with the illustrative embodiments.

Figure 1A:
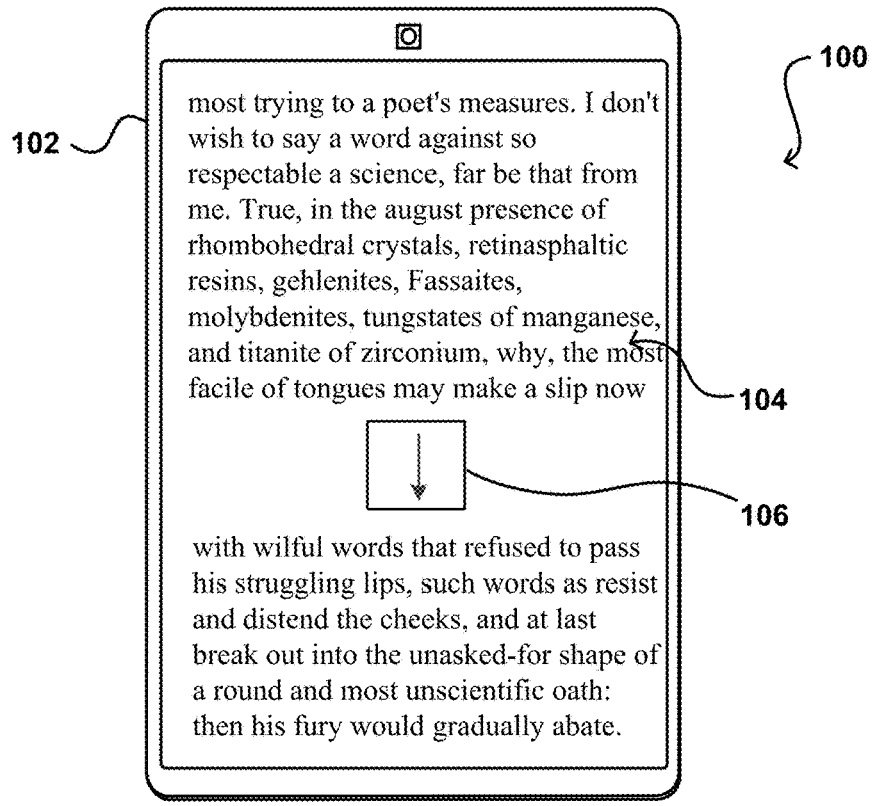
FIGS. 1A and 1B illustrate an e-reader interface on a computing device enhanced in accordance with various embodiments.
Figure 1B:
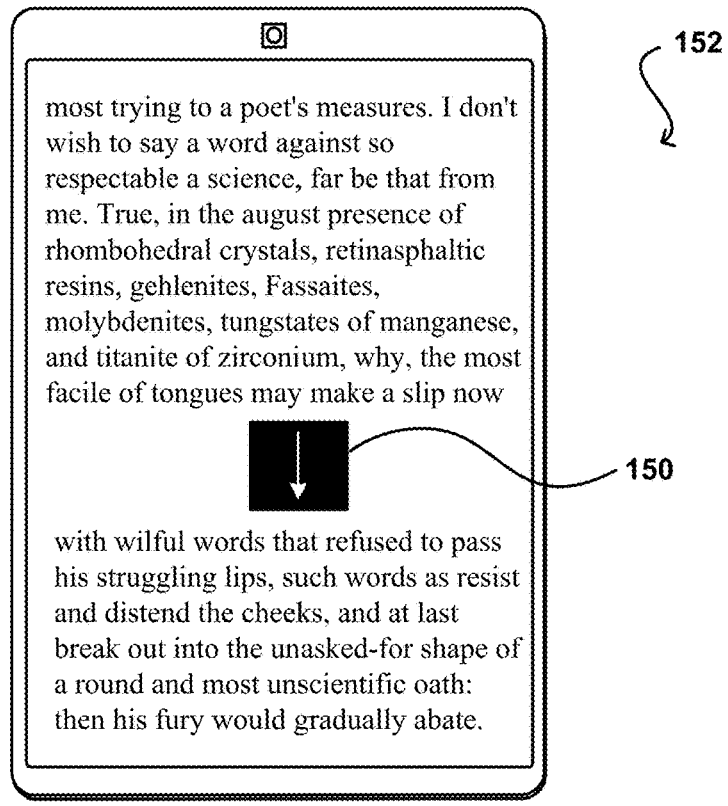

FIGS. 1A and 1B illustrate the result of one example approach for a hardware-based leverage for client device display interfaces, which can be utilized in accordance with various embodiments. In the example situation 100 of FIG. 1A, a client computing device (including an e-reader or other such device) 102 offers a electrophoretic display of a page 104 (or other such grouping) of electronic media content corresponding to an e-book purchased by a user of the device 102, although other types of digital content may be utilized as well. As is known in the art and discussed herein, the electrophoretic device can use substrates and electronics for the display backplane.

While a portable computing device 102 is illustrated for purposes of this example, it should be emphasized that various other types of devices can be utilized to display the content 104 as well, as may include a tablet computer, a smart phone, a desktop computer, a notebook computer, a personal data assistant, a video gaming console, a television set top box, a wearable computer (e.g., a smart watch or glasses), or a portable media player, among other such devices. The size, shape, content, and other aspects of content 104 portions can vary by embodiment, such as may be based upon factors such as screen size, screen resolution, portion of the screen displaying the content, layout of the content, and the like.

As known for such purposes, a user can navigate the content using one or more buttons or other user input mechanisms 106 (i.e., user-selectable page turn buttons or other such elements) of the device 102 in order to read the e-book or perform any number of other actions of interest to the user. Following receipt of at least one signal indicating a user request or input in the form of touching or pressing the displayed button 106, a representative inverted button display 150 is reflected in the updated setting 152 of FIG. 1B. The inverted button display 150 is a sample user interface color effect optimized in line with the present disclosure, and it is useful to both the content provider and readers as the hardware leveraging guarantees that the inversion will be shown by the device 102 and done so for a suitable amount of time. Of note, the term "button" is to be interpreted broadly and encompasses, in addition to any sort of touchable buttons on a displayed interface, any sort of physical hardware-type buttons on the device 102. In the case of hardware button interaction, the inversion (or other update) of a related display element in response to received input may be actuated through, for example, the use of associated height and width coordinates on the display, such as handled by a software widget making an API call using the known or determined coordinates.

Figure 2:
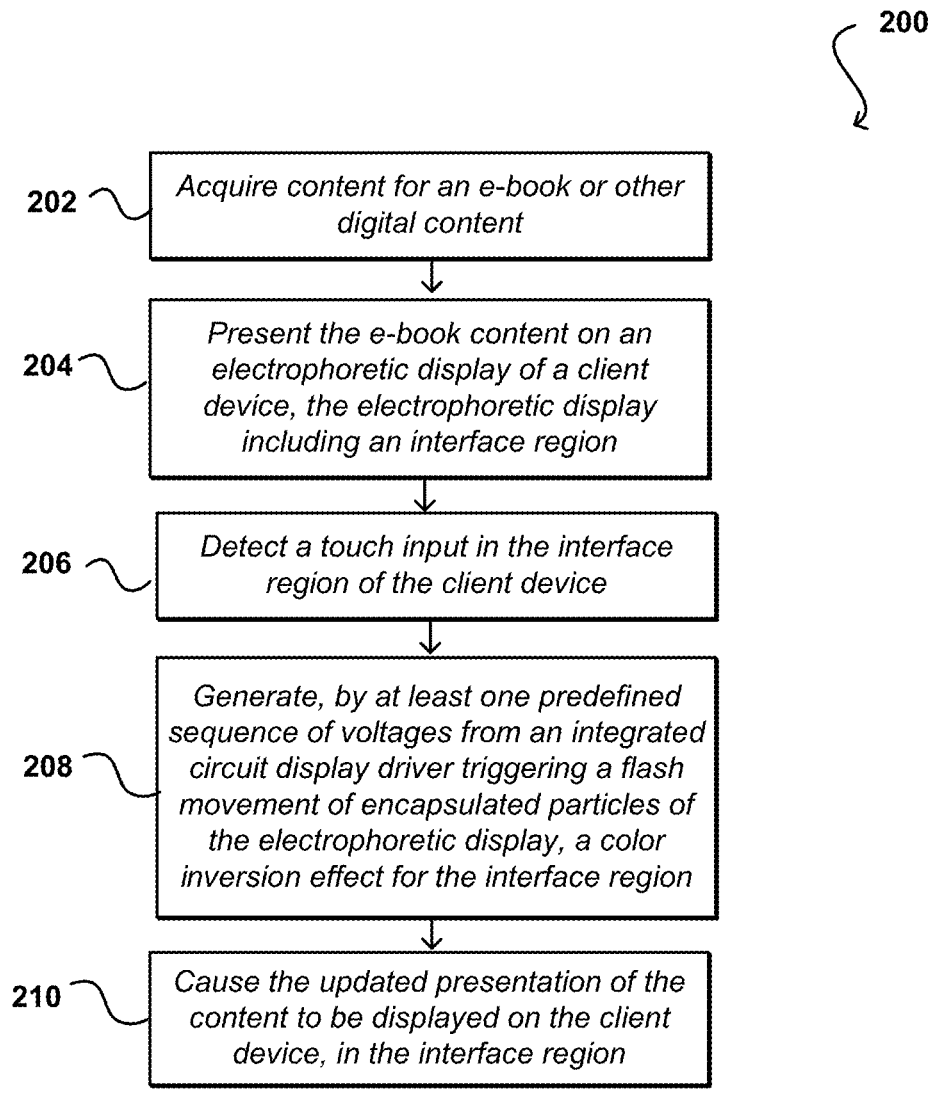
FIG. 2 illustrates an example process flow for enhancing e-reader interface display functionality in accordance with various embodiments.

FIG. 2 depicts a process flow 200 for one illustrative embodiment of the present systems and methods for enhancing the functionality of interactive e-book content, including that reflected in FIG. 1B. In this version, as initial step 202, applying one or more computer systems configured with executable instructions, content is acquired for an electronic media object, such as an e-book. Attributes, such as a unique catalog identifier for the content product, may be employed to assist in this regard. Subsequently, the e-book content is displayed 204 on an electrophoretic display of a client device, with the display including at least one front-end user interface region, such as including one or more buttons. Illustrative embodiments can accommodate buttons of varying sizes, and the layout of a given piece of other content may present source locations for display buttons using width and/or height provided by the author, publisher, or the like. Even more particularly, in some embodiments of the present systems and methods, an enhanced layout specification may be based on image orientations (e.g., landscape or portrait) and image width/height ranges, in pixels.

A consumer perusing the content then may provide a request in the form of touchscreen input 206 in a front-end user interface region, by pushing one of the one or more buttons. At that point, upon occurrence of the button pressing event, the user interface sends one or more electronic signals to a "native" or back-end configuration. The consumer input may be processed here by one or more assigned software modules, which can be configured to emit an event indicator for use on the back-end. The events, in representative embodiments, are processed by a windowing system capable of managing and delegating the events to the appropriate hardware and client device window. For example, a window manager can track, and take appropriate action for, window events known in the art, such as windows to be added, windows to be destroyed, geometry changes, screen orientation changes, touchscreen events, key events, and so on. In some illustrative embodiments, a software library, such as GDK 2-D, monitors states and becomes active upon pressing of an interface button. Upon activation, button parameters are determined, including button region, button height, and button width. The appropriate display update action, such as button color inversion, is ascertained and taken, using a hardware device driver rendering call or command. A logical exclusive disjunction ("XOR") operation, such as a fidelity flash, can execute the inversion or other effect.

As discussed herein, at least one predefined sequence of voltages from an integrated circuit display driver triggers a flash movement of encapsulated particles of the electrophoretic display; this display driver action generates 208 a color inversion effect for the pushed button of the user interface region. Such action may be performed by hardware with the assistance of modules and logic controls capable of drawing state changes and actions due to user input. In particular, a software stack, controlling one or more kernel drivers, can make an API call to a window manager, which communicates with hardware-connected layers to specify which user interface display areas are to be updated. Indeed, here the window manager can control the use of voltage sequence waveform(s) for display updates and additionally take into consideration factors such as consumer preferences and the like. The color inversion effect then may be presented 210 to the consumer via the display in the front-end interface region. In at least some embodiments, the inversion or other effect encompasses all imagery and text within the subject display region.

When enhancing button inversion and other interface display functionality, in addition to setting width or height based on a percentage of overall screen size, it is also possible in some embodiments to specify a maximum imagery height and/or width in one or more units of measurement. This approach ensures content effects will not appear scaled on client devices with larger displays, such as tablets and personal computers (laptop and desktop, for example). Further, there will generally be no perceptible delay as the necessary processing will at least occur using client device computing capabilities "on the fly," as the consumer reads, and interacts with, the content.

As noted, the electronic paper/e-ink scheme may use differing waveforms and waveform modes, including those commercially available from third-parties such as E Ink Corporation, when it is desired to flash some imagery or an interface effect on a client device screen. In doing so, a predefined sequence of voltages is applied to the e-ink particles, in order to switch their displayed appearance from one gray tone to another gray tone. The voltage timing sequence can promote charged particles toward or away from the reader. A relatively-high voltage may be needed for the display to attract and repel the e-ink particles.

Traditionally, remnants of a previous e-book image may appear overlaid atop a new image, with this unfortunate situation sometimes called "ghosting." Area ghosting may be caused by transitioning pixels not fully achieving the proper state after a waveform-based update. Edge ghosting can occur when the voltage applied to a given pixel leaks to neighboring pixels, making their state slightly shift. As is known, the flashing technique attempts to clean the ghosting of e-ink particle residue on the client device, by resending the particles and pushing them to the correct positioning. E-ink displays tend to have more a ghostly experience when the temperature is less than 17 degrees or greater than 38 degree Celsius (on a 220V display), although various displays may have differing suitable temperature ranges. The e-ink framework can accordingly flash update each page when the environmental temperature is not within the optimal range.

The various waveforms employed hereunder define the sequence for transitions from any currently displayed grayscale state to a new target grayscale state, at various temperatures. Different waveforms provide tradeoffs between speed, quality (e.g., reduced ghosting), and visual effect of the pixel transition. A particular use case will determine which waveform is best suited, given those tradeoffs. In some embodiments, a software-implemented electronic paper display controller ("EPDC") can be used in connection with the display driver to assist in waveform selection. The EPDC may provide analytical features, such as a histogram distribution as part of any display region processing operations, to characterize the region in terms of grayscale content.

Each waveform can be defined with a waveform table which has the predefined sequence of voltage for a various range of temperatures. In some embodiments, the waveform may be a set of two-bit values used to activate (e.g., turn "on" or drive to substantially white) a pixel or deactivate (e.g., turn "off" or drive to substantially black) a pixel of an e-ink display. In any event, the waveforms allow the software stack to perform various types of hardware-driven screen updates on the pixel level, as a mechanism to drive or push the small e-ink particles (which, as discussed herein, may be encapsulated) of an electrophoretic display in certain ways to desired regions or screen positions. Waveforms can result in a purely black or purely white display area, or grayscale levels somewhere in between. For example, a waveform could "wipe" or remove all content currently displayed on the screen, while a specific waveform can perform a partial update and only alter a specified region of the screen. In the latter case, notable for present purposes, that sort of specific waveform can be used to invert pixel colors displayed in the specified region. Such a regional update can be defined by the rectangular region needing to be updated on the client device screen (i.e., in terms of height and width, along an x-axis and a y-axis).

The type of waveforms employed can have different modes for different electrophoretic display purposes. For example, a waveform can use the "INIT" waveform mode for a full-screen initialization at startup. "DU" and "DUK" medium-fidelity direct updates are partial in nature and can update any changed gray tone pixel to black or white. The "GC16" and "GCK16" modes are often employed for high-fidelity updates of sparse content (usually images) on a white background and can be used for 16-level grayscale pixels. As the hardware and software does not know that ghosting has occurred, an effective way to clear stray particle residue is to flash the whole screen using a "GC16" full update. The "GL16" and "GLKW16" reduced flashing waveform modes are frequently used for full or partial screen updates involving text. The "GLR16" waveform mode is capable of full or partial updates involving text where reduced edge ghosting is a concern. The "A2" animation partial-update waveform mode is similar to "DU," except that it operates at a higher speed, but does not guarantee the desired output pixel and can result in more ghosting and reduced image quality. A "REGAL" waveform mode is used for a 16-level grayscale pixel update on a white background and reduced edge ghosting.

Figure 3:
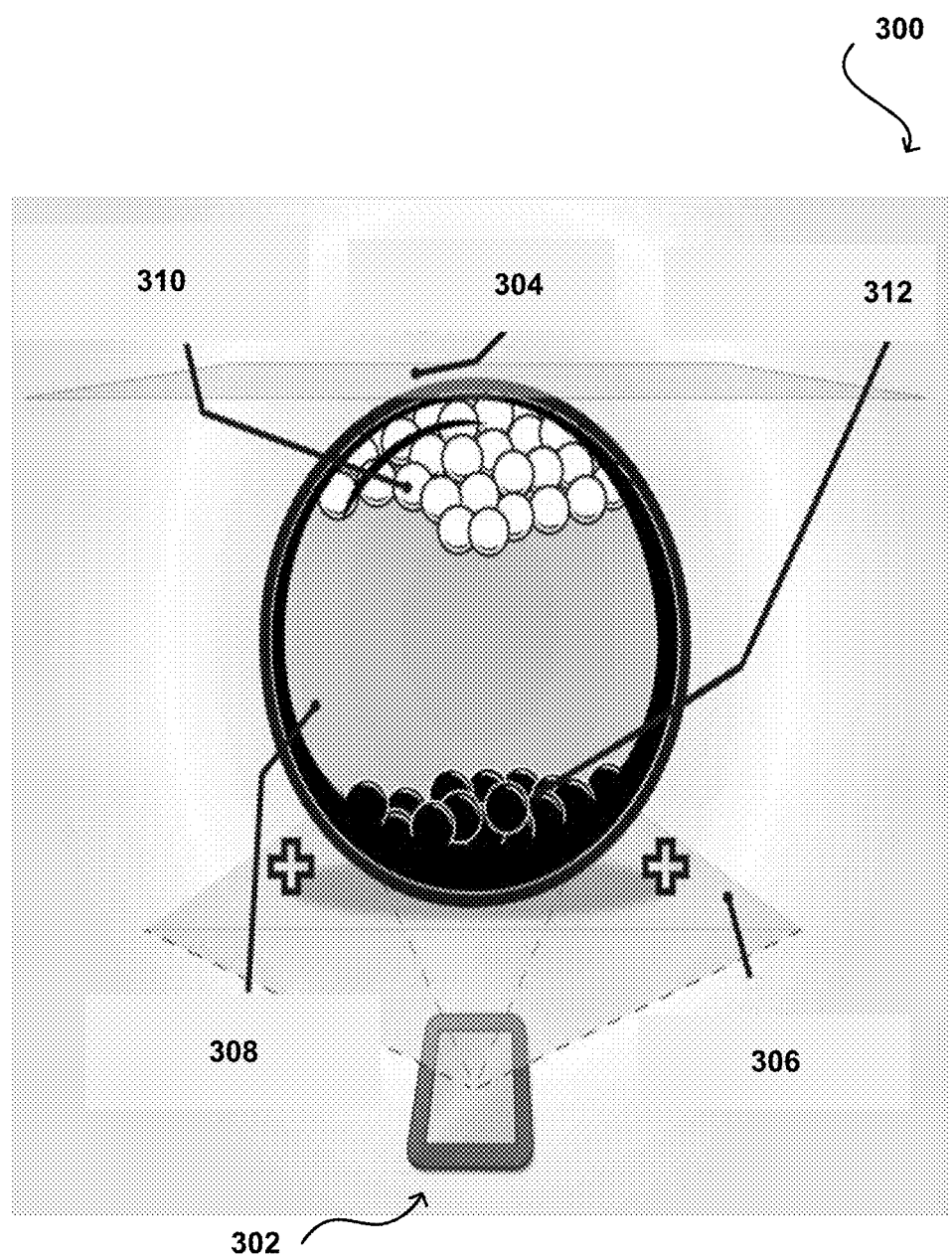
FIG. 3 illustrates certain features of a representative electronic paper display used for inversion and other effects on a display of an e-reader in accordance with various embodiments.

Shown in FIG. 3 are certain relevant details of a typical electrophoretic display 300 as may be employed in connection with the various systems and methods hereunder. The display 300 is presented on a client device 302 including a transparent top electrode 304 as well as a bottom electrode 306. It is between those at least two display electrodes that the e-ink material is found and moved. The display 300 scheme in general can use an array of small microcapsules containing positively-charged and negatively-charged dark and white particles within a viscous medium. In this representative illustration, the e-ink material is in encapsulated form, with each of many display capsules holding a clear medium fluid 308, positively-charged white pigment 310, and negatively-charged black pigment 312. Temperature can affect the viscosity of the medium fluid 308 and likely needs to be compensated, potentially via particular waveform selection and voltage timing as discussed herein. The display 300 typically can support sixteen levels of gray coloring and may be bi-stable, meaning the maintenance of content currently displayed consumes no additional power.

As noted, in various illustrative embodiments, a hardware display driver controls and performs the display 300 updates, in response to receiving user touchscreen input, by essentially pushing the e-ink capsules through the application of selected waveforms of voltages. All of the updates can be defined in terms of one or more regions of the screen, rectangular in some embodiments. Pixel processing operations and update flags may point to what is to be executed for the subject region. The display driver will examine each pixel in the update region and bin the pixels that are changing to determine which waveform would best apply. A waveform association table, including that provided by third-party e-ink suppliers, can assist with the automated waveform selection.

The display driver can factor ambient temperature into its analyses. In some embodiments, the software stack includes a waveform flash file containing multiple temperature look-up-tables ("LUTs"). Each temperature LUT has the waveform sequence information to allow the display driver to construct a waveform for generating images on the electrophoretic display. Multiple update modes (including those discussed above) may be encoded in the waveform within each temperature LUT. A LUT is cleared once the waveform associated with a given update is completed. The display driver hardware presently supports up to 64 concurrently active, non-overlapping update regions (LUTs) at a time, and further updates can be placed in one or more queues. A unique identifier, such as a flag or marker, can be associated with a given display update for tracking purposes, so that the client device will, in effect, know when that update has completed; at that point, queued updates may be performed.

Again, the present systems and methods can perform a variety of full-screen and partial-screen display effects, including color inversion as well as dithering and forcing a display region to become monochrome. Further, the display driver can utilize a register for pixel row selection and loading multiple bits simultaneously. As noted, the display driver hardware supports non-overlapping concurrent updates. Should an attempt be made to update a display region which is already in the process of being updated, the present systems and methods can detect a collision. The subject display region should then be re-queued, awaiting completion of the active update.

Optionally, flags, markers, or any number of other forms of identifiers can be used to provide information such as the waveforms modes to use and/or portions of interactive content to process. The flags can specify specific numbers or parameters in some embodiments, and they can provide information that can be used with other information about the client device and/or content to determine the appropriate action.

Figure 4:
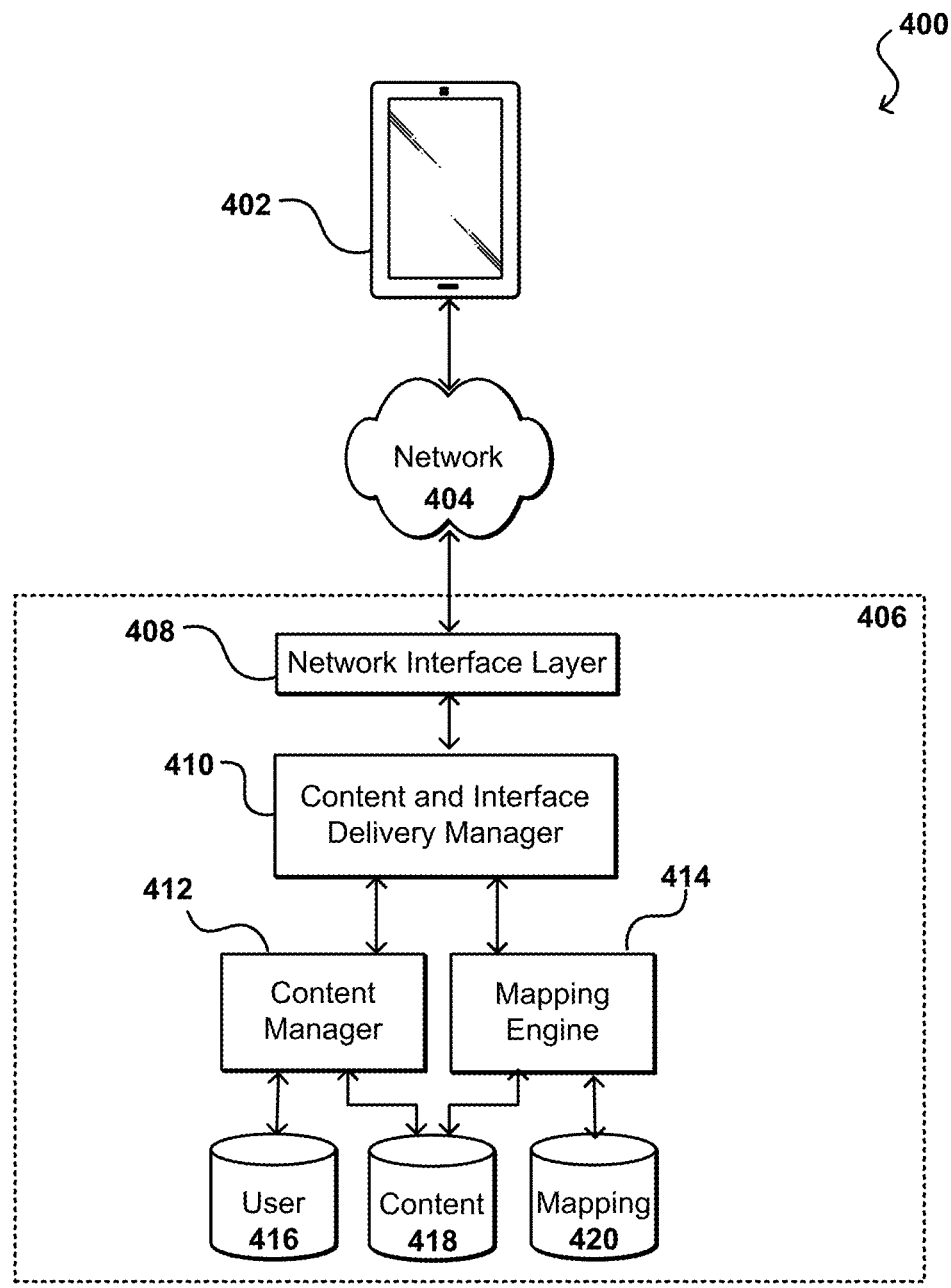
FIG. 4 illustrates an example system that can be utilized to implement aspects of the various embodiments.

FIG. 4 provides a high-level view of an illustrative environment 400 in which digital content, such as e-book content having the user interface effect capabilities described herein, to a user. In this example, a consumer can utilize an electronic client device 402, such as an e-book reader, to purchase, download, or otherwise obtain e-book content. For example, a user can cause the device 402 to submit a request for the digital content across at least one appropriate network 404, whereby the content (or at least a portion of the content) is returned for presentation on the device 402. In some embodiments the entire e-book can be transmitted to the electronic device 402 in a single transmission (or batch of transmissions), while, in other embodiments, portions of the e-book can be transmitted on-demand, such as when a user is about to access a new page of content. The network 404 can include any appropriate network, including the Internet, a local-area network ("LAN"), a cellular network, and the like. The request can be sent to an appropriate content provider back-end 406, as may provide one or more services, systems, or applications for processing such requests and providing access to the appropriate content. In this example, the request is received by a network interface layer 408 of the content provider system 406. The network interface layer 408 can include any appropriate components known or used to receive requests from across a network, such as may include one or more APIs or other such interfaces for receiving such requests. The network interface layer 408 might be owned and operated by the provider, or leveraged by the provider, as part of a shared resource or "cloud" offering. The network interface layer 408 can receive and analyze the request, and it may be capable of causing at least a portion of the information in the request to be directed to an appropriate system, service, or component, such as an overall content and interface effect delivery manager 410.

A content manager 412, to facilitate interface analyses and enhancements contemplated herein, may employ one or more software modules or functions handling content interactive features, including button mining and display effect optimization, among other tasks. The content manager 412 can also look up information in a user data store 416 or other such location to determine whether the user has access rights to the requested content on the particular client device, such as where the user has purchased the content for viewing on that device or has an account with access to the content, among other such options. If the user has access rights, the content can be pulled from a content data store 418 or other such location and transmitted across the at least one network 404 (using the same or different component networks) for display on the client device 402.

As the user is viewing or otherwise consuming the content on the device 402, the device might determine to periodically update portions of the page based upon factors such as received user touchscreen input as contemplated herein. Accordingly, the device 402 can submit a request for the next page of content to the content provider, whereby the content delivery manager can determine the portion of content to send and cause that content to be sent to the device 402. It might be the case in some embodiments that the device 402 will send information specifying the content to be received. Often, however, the device 402 will not know enough information in advance to request the specific content needed. In such instances, approaches in accordance with various embodiments obtain information such as screen size and resolution (both of which may be obtainable using device type information), font settings, application display area, and other such factors to determine the amount of content that is displayable concurrently on the device.

A mapping engine 414 or other such component can then compare this information against the available content from a content repository 418 to determine the portion of content and/or display effects to provide to the device 402. The mapping engine 414 might utilize mapping data providing information about how to handle certain content on certain devices, such as images and tables, as well as how to insert flags or tags into the content that can cause the device to update portions of the content in specific ways, including the hardware-leveraged interface effects contemplated herein. The content from the mapping repository 420 in some embodiments thus may be rules or policies instead of specifications or other specific mapping data. There may also be specific mapping information for certain users or types of users, as may be based upon preference or historical information among other such options. Each time new content and/or interface effects are to be displayed on the electronic client device 402, the appropriate content and/or effect can be determined and transmitted to the device 402. In some embodiments more than a page (or half page, etc.) of content may be transmitted, or may be transmitted in advance, in order to reduce latency and ensure that a smooth user experience is provided in the event of a temporary loss of network or data connection, among other such events. For the avoidance of doubt, though, there is no need for separate databases of stored optimized content in order to leverage display capabilities as contemplated herein.

In some embodiments, a given piece of content delivery software's existing button inversion and other display effects may be analyzed to determine whether the effects are acceptable, without the need for hardware-leveraged optimization per the present disclosure. This validation-type check, which can be performed (including by a trained neural network) prior to deployment of the effect features herein, may be performed by a quality detection module or element capable of detecting display feature quality, and could serve to ensure that the present display effect features are deployed only when necessary. The quality detection module can calculate and provide a quality score considering display visibilities before and after activation of a particular client device display screen button. Manual validation is also possible, as an addition or alternative to the automated step.

Again, it is certainly within the scope of the present disclosure that a myriad of client devices be used with these systems and methods for hardware-leveraged interface display effects. And the interface display effects can be performed on any number of formats of electronic content, including, by way of example, magazines, newspapers, and research papers.

As noted, neural network, deep learning, and other machine learning techniques have any number of applications for present purposes. As is known in the neural network and artificial intelligence arts, a variety of neural network types could be applied, including, but by no means limited to, feedforward, recurrent, radial basis function, modular, and self-organizing neural networks. Prior to production environment use, a non-production sample data set of typical e-book content may be employed for training a neural network model for processing subject content. Although graphics processing units ("GPUs") are effective for many deep learning neural network applications, the present systems and methods can be used with GPU-based or central processing unit ("CPU")-based systems.

More particularly, with the emergence of the deep convolutional neural network ("CNN"), a programming and information processing paradigm allowing a machine to learn from data, object detection performance has improved significantly. CNNs are a family of statistical learning models used in machine learning applications to estimate or approximate functions which depend on a large number of inputs. The various inputs are interconnected with the connections having numeric weights that can be tuned over time, enabling the networks to be capable of "learning" based on additional information. The adaptive numeric weights can be thought of as connection strengths between various inputs of the network, although the networks can include both adaptive and non-adaptive components. CNNs exploit spatially-local correlation by enforcing a local connectivity pattern between nodes of adjacent layers of the network. Different layers of the network can be composed for different purposes, such as convolution and sub-sampling. There is an input layer, which along with a set of adjacent layers, forms the convolution portion of the network. The bottom layer of the convolution layer, along with a lower layer and an output layer, makes up the fully-connected portion of the network. A number of output values can be determined from the output layer, which can include several items determined to be related to an input item, among other such options.

For example, one or more systems herein trained by machine learning can perform automated improvements to features such as waveform selection. Metrics (including scoring thereof), derived through machine learning, may assist the content provider in understanding tracking and performance notions such as percentages of each waveform used in connection with particular types of content as well as the average latency of performing a user interface effect as discussed herein. Any such metrics may be used for fine-tuning the interactive experience on a client device and could assist in flagging a particular rule in need of attention when production use numbers deviate from what is expected. And user behavior can also be tracked in order to more accurately determine how to optimize the display of content and interactive user effects Any type of neural network employed in connection with the present disclosure will likely need tweaking and/or additional or alternative elements to fit the specifics of particular situations. In certain embodiments, training a CNN may involve significant use of computation resources and time, such that this may correspond to a preparatory step to servicing content display requests and/or performed relatively infrequently with respect to request servicing and/or according to a schedule. As known in the object-oriented and other computer science arts, the machine learning features hereunder may be accomplished through the use of separate software modules executing on top of a feature map.

Figure 5:
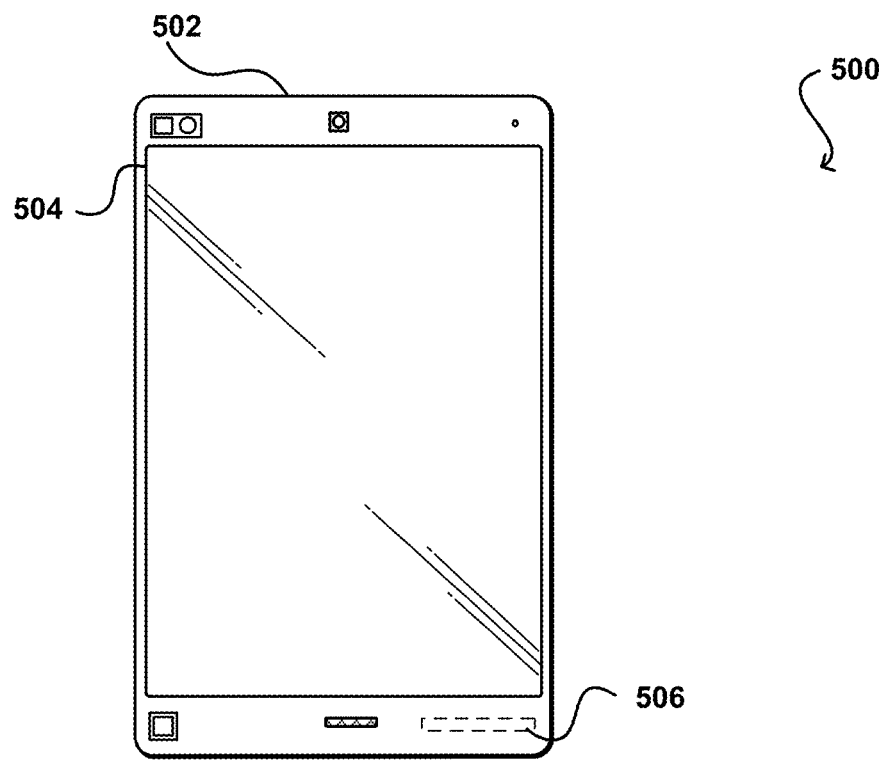
FIG. 5 illustrates an example computing device that can be used to implement aspects of the various embodiments.

As noted herein, and illustrated in FIG. 5, the systems and methods include the use of electronic computing devices 500, including client devices, which can include any appropriate device operable to send and receive requests, messages, or information over an appropriate network and convey information back to a user of the device. These devices 500 can include any of a number of general purpose personal computers, such as desktop or laptop computers running a standard operating system, as well as cellular, wireless, and handheld devices running mobile software and capable of supporting a number of networking and messaging protocols. Examples of such client devices include e-readers, personal computers, cell phones, handheld messaging devices, laptop computers, tablet computers, set-top boxes, personal data assistants ("PDAs"), and the like. In the FIG. 5 example, the computing device 500 has an outer casing 502 and a display screen 504, such as one that is an electrophoretic touchscreen display. The display screen 504 under normal operation will display information to a user (or viewer) facing the screen (e.g., on the same side of the computing device as the display screen). In line with the disclosure herein, the device can internally include one or more communication components 506, such as may include a cellular communications subsystem, Wi-Fi communications subsystem, Bluetooth® communication subsystem, and the like. Such a device also can be in the form of workstations running any of a variety of commercially-available operating systems and other known applications for purposes such as development and database management.

Figure 6:
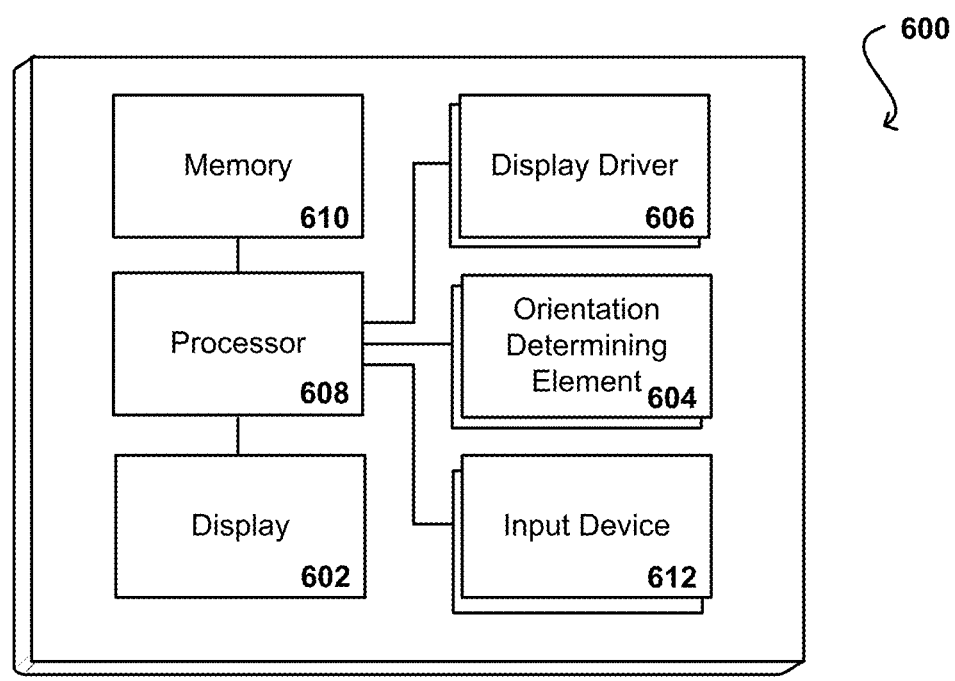
FIG. 6 illustrates example components of a computing device that can be utilized in accordance with various embodiments.

In this vein, FIG. 6 shows some components of note for a computing device 600 which can be used to optimize and display content and interface effects for a user in accordance with various embodiments. While a portable smart device is discussed and depicted in many examples herein, the computing device 600 could be any appropriate device able to receive and process input commands, such as a personal computer, laptop computer, television set top box, cellular phone, PDA, e-book reading device, video game system, or portable media player, among others. This example device 600 includes a display element 602, such as a liquid crystal display ("LCD") and/or an electrophoretic touch-sensitive display screen, for displaying information to a user as known in the art. That said, devices such as portable media players might also convey information via other means, such as through audio speakers. The example device 600 also includes at least one orientation-determining element 604, such as an accelerometer or gyro element, which can be used to determine orientation and/or motion of the device. Methods for using elements such as accelerometers to determine orientation or movement of a device are also known in the art and will not be discussed herein in detail. Other elements for detecting orientation and/or movement can be used as well within the scope of various embodiments, for use as the orientation determining element.

The device 600 may also include display driver hardware 606 and image processing capabilities, including one or more image capture elements which could be in the form of, for example, a front-facing camera, a charge-coupled device ("CCD"), a motion detection sensor, or a radiation sensor, among many other possibilities. The example device 600 can also include a microphone or other such audio-capturing device. The device 600 in at least some embodiments can also determine various actions based upon sound detected by the microphone. The computing device 600 can store, or otherwise have access to, at least one algorithm to process and analyze content and user interaction, as may be stored at least temporarily on the device itself, or it can send such to be analyzed and otherwise processed by a remote computer or service. Any of a number of algorithms known in the computing art can be used to obtain and present content, detect and apply applicable features, enhance user interface effects, and the like. Various other options can be utilized as well as discussed and suggested herein.

In this example, the device 600 further includes one or more processors 608 for executing instructions that can be stored in a memory device or element 610. As known in the art, the device 600 can include many types of memory, data storage, or computer-readable media, such as a first data storage for program instructions for execution by the processor 608, a separate storage for images or data, a removable memory for sharing information with other devices, etc.

In some embodiments, the device 600 can include at least one additional input device 612 able to receive conventional input from a user, triggering a display update as contemplated herein. This conventional input can include, for example, a push button, touch pad, touch-sensitive element used with a display, wheel, joystick, keyboard, mouse, keypad or any other such device or element whereby a user can input a command to the device 600.

Different components, such as one or multiple differing display drivers 606, can be used to render or otherwise display different portions of the content and interface effects on a client device. For example, if the content can flip one half of the page at a time, a computing device might include a pair of display drivers 606 for displaying content on different halves of the screen, although in some embodiments each driver 606 may not be limited to exactly half of the screen. Each device driver 606 can be implemented via hardware (plus any accompanying software) and may include an integrated circuit ("IC") or state machine that accepts commands from a processing component or interface and generates signals useful for displaying the desired content and effects on the relevant portion of the display element(s). In at least some embodiments, a display driver 606 is a semiconductor IC accepting commands over a general purpose interface, such involving as Transistor-Transistor Logic ("TTL") or Complementary Metal-Oxide-Silicon ("CMOS"), and generates signals with the appropriate current, voltage, and other properties for pixels of the appropriate display element. The display driver 606 in some embodiments can include memory, firmware, and other such elements. Factors such as screen size and font size may enable additional or fewer portions of a user interface on the client display 602 to be updated as appropriate.

As discussed, the various embodiments can be implemented in a wide variety of operating environments, which in some cases can include one or more computing devices which can be used to operate any of a number of applications. Back-end user or client reading devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin clients, gaming systems, and other devices capable of communicating via a network.

Various aspects also can be implemented as part of at least one Web or other service, such as may be part of a service-oriented architecture. Services such as Web services can communicate using any appropriate type of messaging, such as by using messages in extensible markup language ("XML") format and exchanged using an appropriate protocol like SOAP (derived from the "Simple Object Access Protocol"). Processes provided or executed by such services can be written in any appropriate language, such as the Web Services Description Language ("WSDL"). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a LAN, a wide-area network ("WAN"), a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, and the like), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The systems and various devices also usually will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk ("DVD") or other optical storage, magnetic cassettes, magnetic tape, magnetic disk storage or other magnetic storage devices, or any other non-transitory computer-readable storage medium which can be used to store the desired information and which can be accessed by the a system device. Based on the disclosure and teachings provided herein, a person of ordinary skill in the art will appreciate other ways and/or methods to implement the various embodiments.

All of the specification and drawings are, accordingly, to be regarded in an illustrative, rather than a restrictive, sense. It will be evident that various modifications and changes may be made thereto without departing from the broader spirit and scope of the invention as set forth in the claims.

What is claimed is:

1. A computer-implemented method, comprising:
under control of one or more computer systems configured with executable instructions,
presenting e-book content on an electrophoretic display of a client device, the electrophoretic display including at least a first user interface region;
receiving a request signal representative of touch input in the first user interface region;
generating, by at least one predefined sequence of voltages from an integrated circuit display driver triggering a flash movement of encapsulated particles of the electrophoretic display, a color inversion effect for the first user interface region wherein the at least one predetermined sequence of voltages is associated with a waveform;
applying the convolutional neural network to determine the waveform, the convolutional neural network trained using a sample data set, the sample data set including information associated with a catalog of one or more instances of electronic media; and
presenting the color inversion effect in the first user interface region.

2. The computer-implemented method of claim 1, wherein the flash movement is performed by a window manager applying one or more waveforms defining the at least one predefined sequence of voltages.

3. The computer-implemented method of claim 1, wherein the color inversion effect includes a change from a first grayscale tone to a second grayscale tone.

4. The computer-implemented method of claim 1, wherein the first user interface includes one or more elements enabling navigation of the e-book content.

5. A computer-implemented method, comprising:
under control of one or more computer systems configured with executable instructions,
presenting content on an electrophoretic display of a client device, the electrophoretic display including at least a first region;
receiving a request signal representative of input upon the first region;
generating, by at least one display update call from a hardware display driver commanding particles of the electrophoretic display, a graphical effect, the at least one display update call bypassing one or more buffers, wherein the at least one display update call is a predetermined sequence of voltages from the hardware display driver, wherein the predetermined sequence of voltages is associated with a waveform;
applying a convolutional neural network to determine the waveform, the convolutional neural network trained using a sample data set, the sample data set including information associated with a catalog of one or more instances of electronic media; and
presenting the graphical effect in the first region.

6. The computer-implemented method of claim 5, wherein the hardware display driver is a semiconductor integrated circuit.

7. The computer-implemented method of claim 5, wherein the at least one display update call bypasses an image buffer.

8. The computer-implemented method of claim 5, wherein the graphical effect in the first region is an inversion of one or more colors appearing in an interactive portion of the content on the electrophoretic display.

9. The computer-implemented method of claim 7, wherein the waveform is directed to a transition from a first grayscale state to a second grayscale state.

10. The computer-implemented method of claim 5, wherein the particles are encapsulated and suspended between at least two electrode plates.

11. The computer-implemented method of claim 5, wherein the content is an e-book or other electronic document.

12. A system, comprising:
at least one processor; and
a memory device including instructions that, when executed by the at least one processor, cause the system to:
present content on an electrophoretic display of a client device, the electrophoretic display including at least a first region;
receive a request signal representative of input upon the first region;
generate, by at least one display update call from a hardware display driver commanding particles of the electrophoretic display, a graphical effect, the at least one display update call bypassing one or more buffers, wherein the at least one display update call is a predetermined sequence of voltages from the hardware display driver, the predetermined sequence of voltages is associated with a waveform;
apply a convolutional neural network to determine the waveform, the convolutional neural network trained using a sample data set, the sample data set including information associated with a catalog of one or more instances of electronic media; and
present the graphical effect in the first region.

13. The system of claim 12, wherein the hardware display driver is a semiconductor integrated circuit.

14. The system of claim 12, wherein the at least one display update call bypasses an image buffer.

15. The system of claim 14, wherein the waveform is directed to a transition from a first grayscale state to a second grayscale state.

16. The system of claim 12, wherein the graphical effect in the first region is an inversion of one or more colors appearing in an interactive portion of the content on the electrophoretic display.

17. The system of claim 12, wherein the particles are encapsulated and suspended between at least two electrode plates.

18. The system of claim 12, wherein the content is an e-book or other electronic document.

* * * * *